(12) United States Patent
Park et al.

(10) Patent No.: US 9,664,176 B2
(45) Date of Patent: May 30, 2017

(54) METHOD OF AUTOMATICALLY CALCULATING POWER CURVE LIMIT FOR POWER CURVE MONITORING OF WIND TURBINE

(71) Applicant: Korea Electric Power Corporation, Seoul (KR)

(72) Inventors: Joon Young Park, Daejeon (KR); Jun Shin Lee, Daejeon (KR); Jae Kyung Lee, Daejeon (KR); Ki Yong Oh, Daejeon (KR); Byoung Mok Park, Daejeon (KR); Keum Seok Kang, Daejeon (KR); Moo Sung Ryu, Daejeon (KR); Seok Tae Kim, Daejeon (KR); Ji Young Kim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 53 days.

(21) Appl. No.: 14/418,922

(22) PCT Filed: Mar. 8, 2013

(86) PCT No.: PCT/KR2013/001874
§ 371 (c)(1),
(2) Date: Jan. 30, 2015

(87) PCT Pub. No.: WO2014/046355
PCT Pub. Date: Mar. 27, 2014

(65) Prior Publication Data
US 2015/0198144 A1    Jul. 16, 2015

(30) Foreign Application Priority Data
Sep. 18, 2012 (KR) .................. 10-2012-0103396

(51) Int. Cl.
*F03D 9/00* (2016.01)
*H02P 9/04* (2006.01)
(Continued)

(52) U.S. Cl.
CPC ................ *F03D 7/00* (2013.01); *F03D 7/02* (2013.01); *F03D 7/0224* (2013.01); *F03D 9/005* (2013.01);
(Continued)

(58) Field of Classification Search
CPC ............... F03D 7/00; F03D 9/005; F03D 9/00
(Continued)

(56) References Cited

U.S. PATENT DOCUMENTS

| 4,525,633 | A * | 6/1985 | Wertheim | ............. F03D 7/0272 290/44 |
| 6,856,039 | B2 * | 2/2005 | Mikhail | ................ F03D 7/0224 290/44 |

(Continued)

FOREIGN PATENT DOCUMENTS

| KR | 10-2010-0031897 A | 3/2010 |
| KR | 10-2012-0095710 A | 8/2012 |

OTHER PUBLICATIONS

Korean Office Action dated Nov. 11, 2013 issued in corresponding Korean Patent Application No. 10-2012-0103396.
(Continued)

*Primary Examiner* — Tulsidas C Patel
*Assistant Examiner* — Thomas Quigley
(74) *Attorney, Agent, or Firm* — McDermott Will & Emery LLP

(57) ABSTRACT

The present invention provides a method of automatically calculating a power curve limit for the power curve monitoring of a wind turbine that may set an optimal power curve limit by automatically calculating a power curve limit for
(Continued)

power curve monitoring even if wind speed-power data measured at a wind turbine includes a large amount of abnormal data in addition to normal data. To this end, the present invention includes: classifying, by an input data classifying unit, the input data on wind power generation through a variable speed bin; calculating, by a power calculating unit, a power average value and standard deviation for each bin for the classified input data; estimating, by a power curve estimating unit, a power curve for the calculated power average value for each bin; searching for, by a limit searching unit, an accurate power curve limit while moving the estimated power curve; and setting, by a data extracting unit, the data included in the accurate power curve limit as new input data.

8 Claims, 30 Drawing Sheets

(51) Int. Cl.
    *F03D 7/00*      (2006.01)
    *G06Q 50/10*      (2012.01)
    *F03D 7/02*      (2006.01)
    *F03D 80/40*      (2016.01)
    *F03D 17/00*      (2016.01)

(52) U.S. Cl.
    CPC .............. *F03D 17/00* (2016.05); *F03D 80/40* (2016.05); *G06Q 50/10* (2013.01); *Y02E 10/723* (2013.01)

(58) Field of Classification Search
    USPC .................................................. 290/44, 55
    See application file for complete search history.

(56) References Cited

U.S. PATENT DOCUMENTS

| | | | | |
|---|---|---|---|---|
| 7,228,235 B2 * | 6/2007 | Grzych | ............... | G06Q 10/04 702/3 |
| 7,259,471 B2 * | 8/2007 | Basteck | ............... | F03D 11/02 290/43 |
| 2009/0033313 A1 | 2/2009 | Jurkat et al. | | |
| 2009/0299780 A1 | 12/2009 | Sarkar et al. | | |
| 2010/0283245 A1 * | 11/2010 | Gjerlov | ............... | F03D 7/0224 290/44 |
| 2012/0091713 A1 * | 4/2012 | Egedal | ............... | F03D 7/0224 290/44 |
| 2012/0139244 A1 * | 6/2012 | Bonnet | ............... | F03D 7/02 290/44 |
| 2012/0261919 A1 * | 10/2012 | Nakashima | ........... | F03D 7/0284 290/44 |
| 2012/0292903 A1 * | 11/2012 | Merkel | ................ | F03D 7/0272 290/44 |

OTHER PUBLICATIONS

A. Kusiak, et al., "Models for monitoring wind farm power," Renewable Energy 34 (2009), pp. 583-590.
A. Verma, "Performance monitoring of wind turbines: a datamining approach," University of Iowa, Iowa Rearch Online, dissertation, 2012.
E. Hau, "Wind Turbines: Fundamentals, Technologies, Application, Economics," 2nd Edition, pp. 495-503.
M. Sheehy, "Wind Energy: Optimising Operations," The Engineers Journal 237, pp. 237-239.
A. Verma, et al., "Predictive Analysis of Wind Turbine Faults: A Data Mining Approach," Department of Industrial Engineering, The University of Iowa, Proceedings of the 2011 Industrial Engineering Research Conference, pp. 1-9.
Z. Zhang, "Power Curve: Concepts and Application" (Presentation Material),Intelligent Systems Laboratory, The University of Iowa.
P. Caselitz, et al., "Rotor Condition Monitoring for Improved Operational Safety of Offshore Wind Energy Converters," Journal of Solar Energy Engineering, May 2005, vol. 127, pp. 253-261.
A. Kusiak, et al., "On-line Monitoring of Power Curves," Renewable Energy, 34 (2009) pp. 1487-1493.
M. Heath, "Scientific Computing: An Introductory Survey," Second Edition, pp. 330-331.
N. Forsman, "An analytical tool for the evaluation of wind power generation," Dept. of Energy and Environment, Chalmers University of Technology, Goteborg, Sweden, 2011, pp. 1-50.
E. Sainz et al., "Robust filtering for the characterization of wind turbines: Improving its operation and maintenance," Energy Conversion and Management, 2009, pp. 1-12.
A. Llombart-Estopinan, "Improving the operation and maintenance of wind farms: determination of wind turbine performance," RE&PQJ, vol. 1, No. 6, Mar. 2008, pp. 8-14.
A. Marvuglia et al., "Learning a wind farm power curve with a data-driven approach," World Renewable Energy congress 2011—Sweden, May 8-13, 2011, pp. 4217-4224.
German Office Action issued in Application No. 11 2013 004 526.5 dated Dec. 21, 2016.

\* cited by examiner

Dirt or bugs on blades

Icing on blades

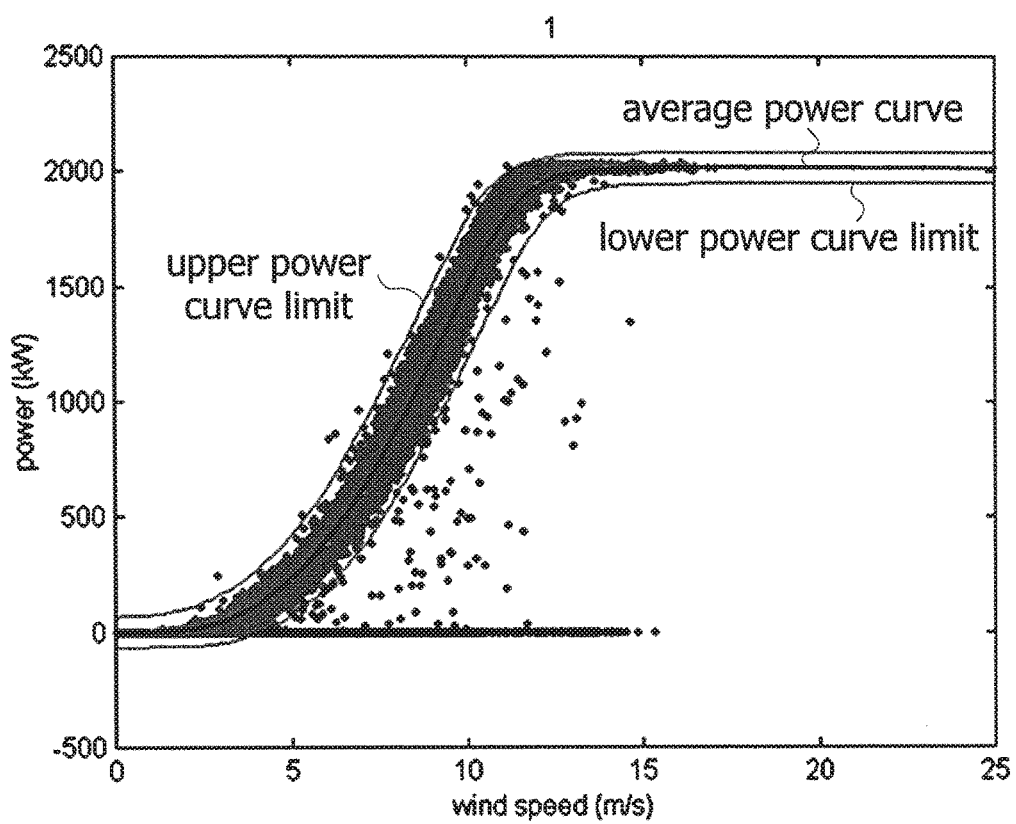

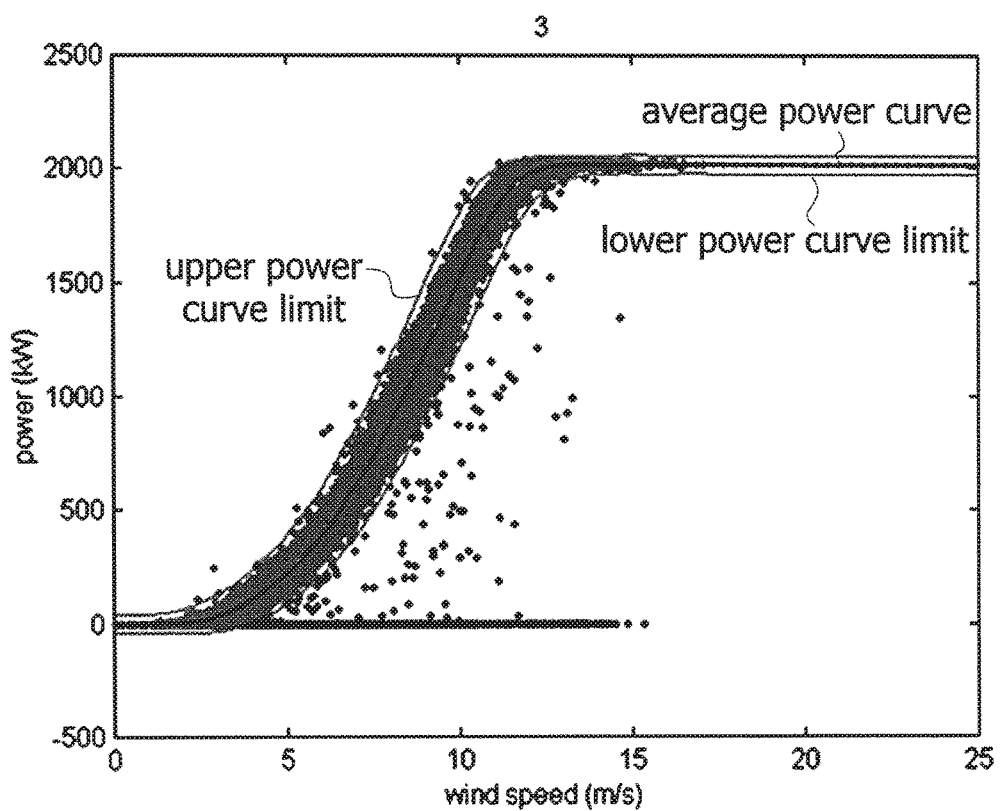

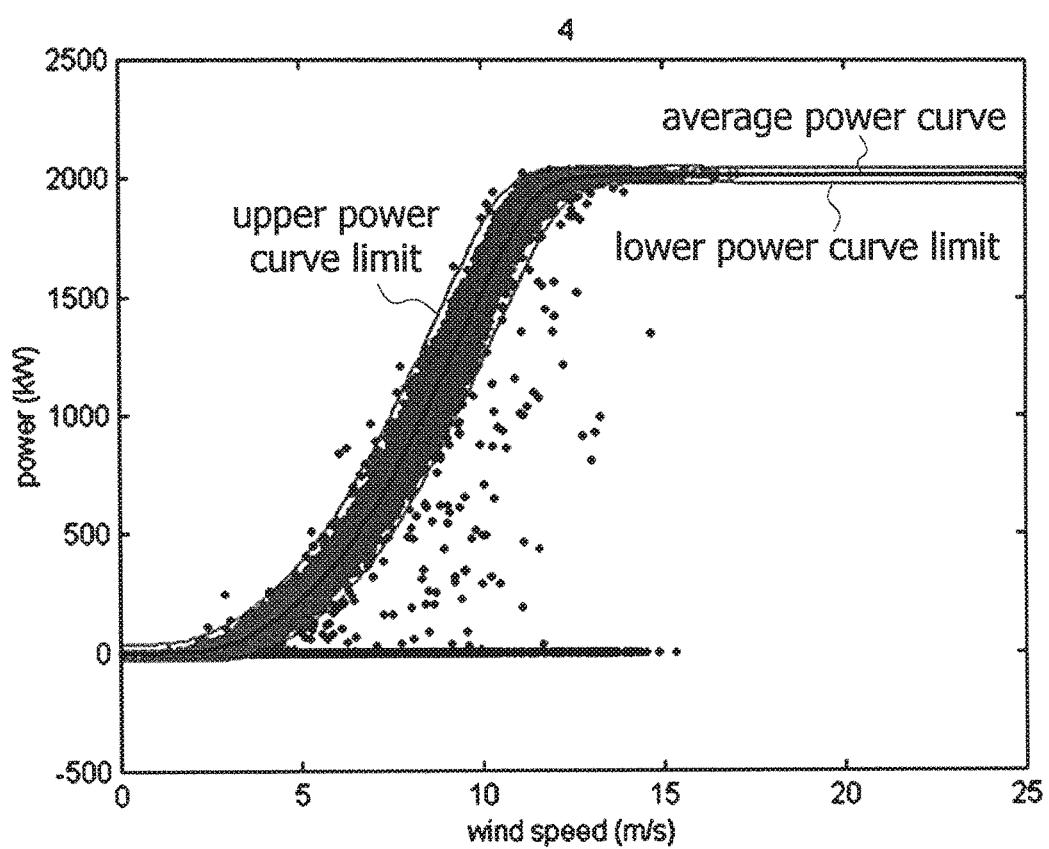

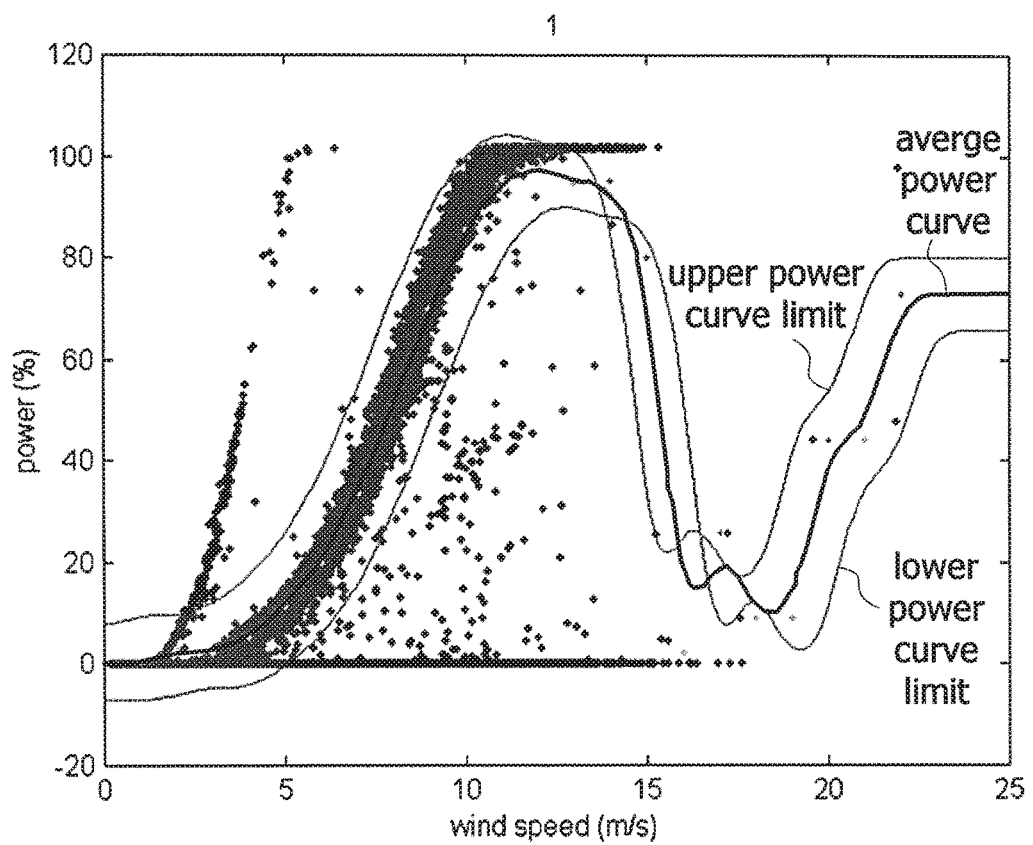

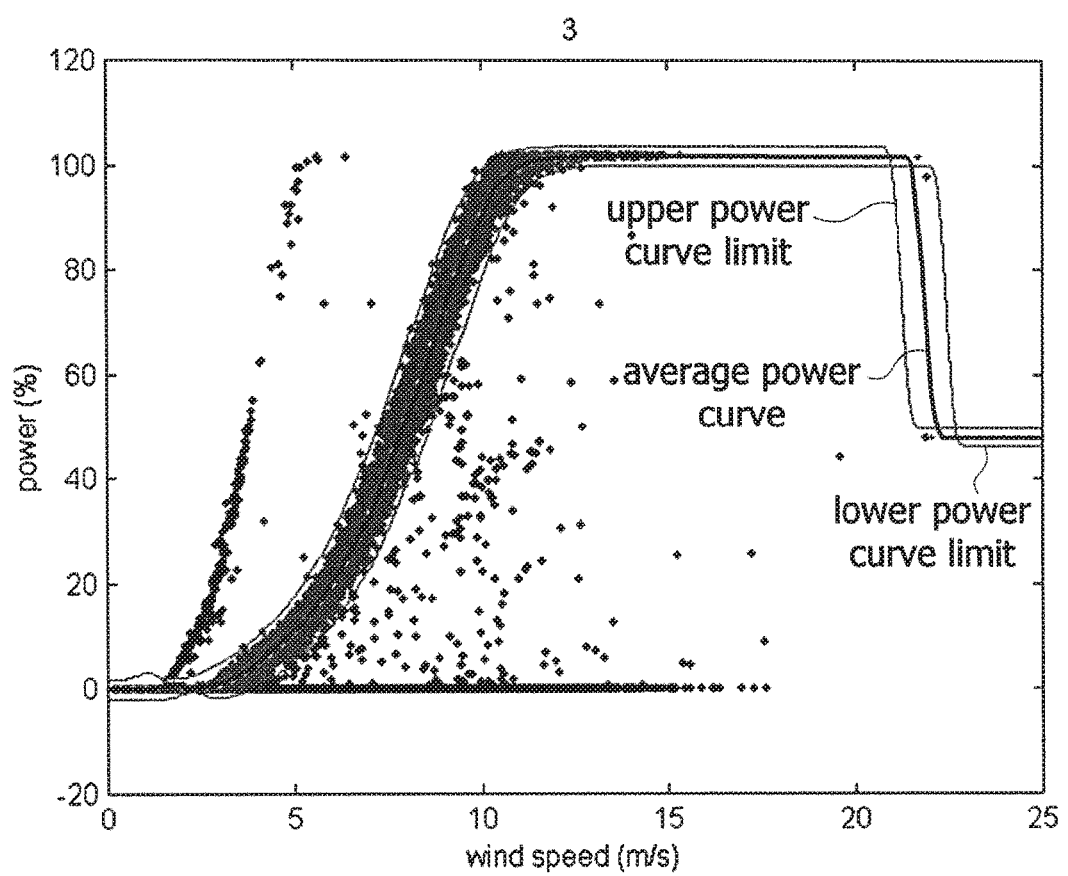

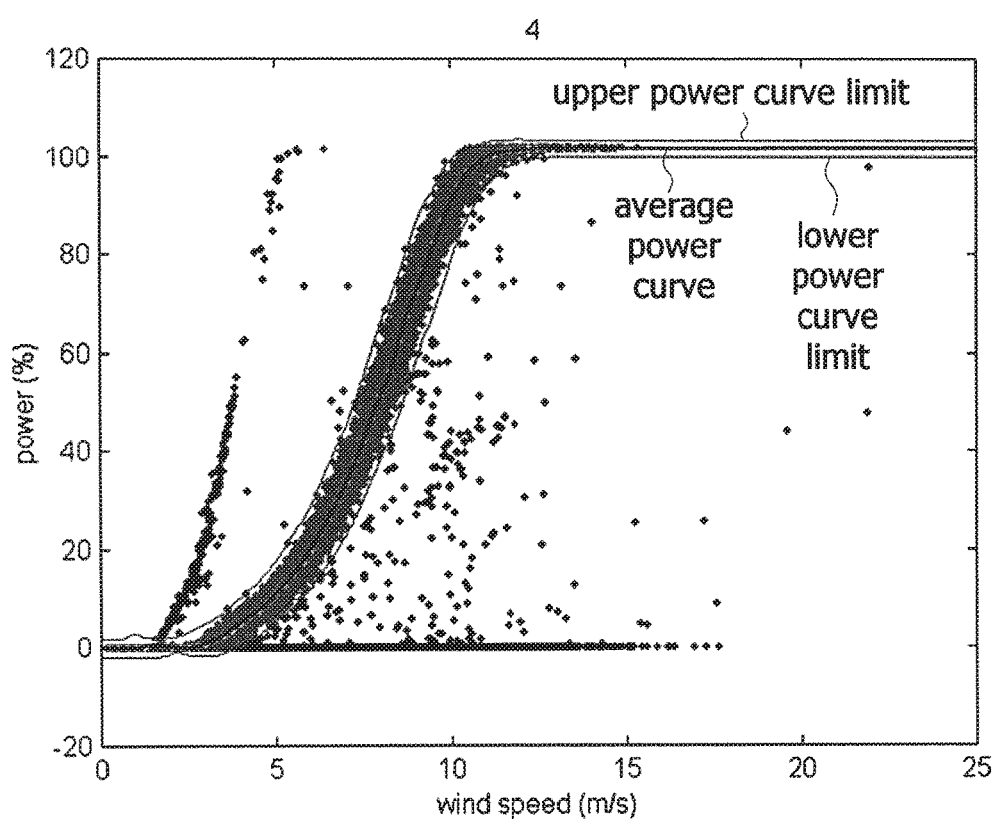

METHOD OF AUTOMATICALLY CALCULATING POWER CURVE LIMIT FOR POWER CURVE MONITORING OF WIND TURBINE

RELATED APPLICATIONS

This application is the U.S. National Phase under 35 U.S.C. §371 of International Application No. PCT/KR2013/001874, filed on Mar. 8, 2013, which in turn claims the benefit of Korean Patent Application No. 10-2012-0103396, filed on Sep. 18, 2012, the disclosures of which are incorporated by reference herein.

TECHNICAL FIELD

The present invention relates to a method of automatically calculating power curve limits for power curve monitoring of a wind turbine, and more particularly, to a method of automatically calculating power curve limits for power curve monitoring of a wind turbine which can exclude much faulty data included in wind speed-power data measured in a wind turbine and automatically calculate optimal power curve limits for power curve monitoring.

BACKGROUND ART

Generally, wind farms have to be efficiently and stably operated. To this end, a supervisory control and data acquisition (SCADA) system and a condition monitoring system (CMS) are used as representative key operating technologies.

A SCADA system for operating a wind farm is a computer-based system remotely controlling wind turbines in conjunction with a controller thereof and acquiring data for analyzing and reporting operating performance of the wind turbines, and performs control, monitoring, analysis, and reporting functions.

The SCADA system which has been developed with emphasis on overall operation of a wind farm is focused on monitoring of current operating conditions of individual wind turbines. That is, in order to monitor the individual wind turbines, the SCADA system is focused on acquiring and analyzing representative characteristic values of components, particularly, temperature and pressure values in addition to information concerning turbine operation.

As described above, the SCADA system is focused on monitoring the current operating conditions of the wind turbines, whereas a condition monitoring system (CMS) is aimed at diagnosing malfunctions of wind turbines at an early stage and preventing breakdown thereof by more carefully monitoring, analyzing, and predicting conditions of wind turbine components, thereby enhancing reliability and economic feasibility of the wind turbines.

The condition monitoring system is mainly classified into a blade condition monitoring system, a component vibration condition monitoring system, and an oil condition monitoring system according to monitoring regions and diagnoses malfunctions in advance using a variety of advanced analysis techniques.

Like the SCADA system, the condition monitoring system performs monitoring, analysis, and reporting functions. However, the condition monitoring system is differentiated from the SCADA system in terms of monitoring target regions and analysis and prediction techniques.

As described above, the SCADA system and the condition monitoring system monitor malfunctions of individual wind turbine components, such as a blade, a gear box, and a generator and generate alarm messages by differentiating alarm levels (e.g., caution, warning, and alarm) according to a predicted degree of influence of the malfunctions.

However, a technique of determining malfunctions in terms of an entire wind turbine system instead of individual components is not yet applied to the SCADA system or the condition monitoring system.

A power curve showing wind turbine power versus wind speed in a graph form is a representative indicator representing turbine performance in terms of an entire wind turbine system, as an official performance assurance indicator of a wind turbine that has to be ensured by a turbine manufacturer.

FIGS. 1A-1G show power curves according to various malfunction examples occurring in a typical power turbine of a wind power generator.

Referring to FIGS. 1A-1G, power curves in various malfunction examples show that, in the case of malfunctions, there are power outputs departing from a normal power curve.

Due to the observation results, monitoring techniques based on a power curve attract the same attention as the condition monitoring system in the condition monitoring of a wind turbine. However, in spite of importance thereof, studies on the power curve monitoring techniques are not being actively conducted yet.

FIG. 2 is a graph showing an example of setting power curve limits measured in ISET according to a typical power curve monitoring technique.

Referring to FIG. 2, in a case study conducted at the Institute for Solar Energy Supply Technology (ISET) in Germany, alarm limits were set by classifying mean value data of power measured for five minutes into bins of a wind speed of 0.5 m/s, followed by calculating a mean value and a standard deviation for each bin.

However, in the method proposed by the ISET, a distance between upper and lower limits is increased with increasing wind speed higher than the rated wind speed to fit a stall-control turbine selected as an application target, thereby making it difficult to apply the method to mainly used pitch control in large-scale wind turbines.

FIGS. 3a and 3b are graphs showing examples of setting power curve limits measured in the intelligent system laboratory according to a typical power curve monitoring technique.

Referring to FIGS. 3a and 3b, a representative power curve monitoring technique is a non-parametric model technique using a data mining algorithm, developed by the Intelligent Systems Lab (Professor Andrew Kusiak) at the University of Iowa in the USA.

The Intelligent Systems Lab tested various data mining algorithms for power curve estimation. Thereamong, k-NN model exhibited the most excellent performance. In addition, the intelligent systems lab proposed the residual control chart technique for setting power curve limits.

However, accuracy of the k-NN model of the data mining technique proposed by the Intelligent Systems Lab can be significantly reduced by faulty data. In addition, each time new data is given, k pieces of adjacent data have to be selected by calculating distances between the new data and all learning data. Therefore, it takes more time to calculate the distances therebetween as the amount of learning data increases.

The related art is disclosed in Korean Patent Publication No. 10-2010-0031897 (entitled "Device for Monitoring Wind Power Generator").

DISCLOSURE

Technical Problem

In the application of the power curve monitoring techniques, there is a common problem of using only normal data, from which faulty data is excluded, as an input for a power curve limit setting algorithm. In the case of an irregular energy source such as wind power, there is no guarantee that only normal data is obtained for all wind speeds during a test run or for a year after installation. Therefore, faulty data must be excluded from measured data in order to actually apply the power curve limit setting algorithm.

However, in the related art, the power curve monitoring techniques are not easy to apply to actual fields since a significant amount of effort and time is required to exclude faulty data for the application of the power curve limit setting algorithm.

The present invention has been conceived to solve such problems in the related art and it is an aspect of the present invention to provide a method of automatically calculating power curve limits for the power curve monitoring of a wind turbine which can set optimal power curve limits by automatically calculating power curve limits for power curve monitoring even if wind speed-power data measured in a wind turbine includes a large amount of faulty data in addition to normal data.

Technical Solution

In accordance with one aspect of the present invention, a method of automatically calculating power curve limits for power curve monitoring of a wind turbine includes: classifying input data of wind power generation through variable speed bins by an input data classification unit; calculating a mean value and a standard deviation of power for each bin for the classified input data by a power calculation unit; estimating a power curve for the calculated mean value of power for each bin by a power curve estimation unit; searching for accurate power curve limits while shifting the estimated power curve by a limit search unit; and setting the input data between the accurate power curve limits as new input data by a data extraction unit.

The input data classification unit may determine wind speed-power data of the input data based on the variable speed bins according to a bin width given by equation below:

Bin Width=1/Number of repetition of entire algorithm loop(m/sec)

The power curve estimation unit may estimate the power curve using interpolation based on the calculated mean value of power for each bin as an input for the interpolation, and the interpolation may be cubic B-spline interpolation.

The limit search unit may search for the accurate power curve limits while shifting the power curve leftwards and rightwards or upwards and downwards.

The limit search unit may repeatedly shift the power curve leftwards and rightwards by a distance of $\Delta V$ until the following inequality is satisfied:

$PDL_i - PDL_{i-1} < \beta_{shift}(i>1)$

The limit search unit may repeatedly shift the power curve upwards and downwards by a distance of $\Delta P$ until the following inequality is satisfied:

$PDL_i - PDL_{i-1} < \gamma_{offset}(i>1)$

PDL may be defined by equation below:

$$PDL_i = \left[ \frac{\text{Number of data present between upper and lower power curve limits}}{\text{Total number of input data}} \times 100 \right]_i$$

The method may further include: after setting the input data, receiving the calculated standard deviation of power for each bin from the power calculation unit and calculating a mean value thereof by a data determination unit; comparing, by the data determination unit, the calculated mean value of the standard deviations with that of previous standard deviations calculated in a previous algorithm loop and determining whether a variation in mean value is less than a constant for determining whether to terminate a power curve calculation algorithm; and determining that the accurate power curve limits have been calculated and terminating execution of an entire algorithm loop when the variation in mean value is less than the constant, and repeating the entire algorithm loop using the new input data when the variation in mean value is greater than the constant.

Advantageous Effects

As described above, according to the present invention, even if wind speed-power data measured in a wind turbine includes a large amount of faulty data in addition to normal data, power curve limits can be automatically calculated by calculating a mean value and a standard deviation of power data input for each bin and estimating a power curve using interpolation, followed by searching for optimal limits while shifting the power curve. Therefore, power curve monitoring techniques can be easily applied to actual fields to rapidly recognize and cope with malfunctions in terms of an entire wind turbine system, thereby maximizing efficiency, reliability, and economic feasibility in the operation of a wind farm. In addition, the algorithm for automatically calculating power curve limits according to the embodiments of the invention can be used as a principal monitoring algorithm of a SCADA system or a condition monitoring system (CMS) for operation and maintenance of a wind farm.

DESCRIPTION OF DRAWINGS

FIGS. 14a to 14d are graphs showing examples according to the number of loops of an algorithm for automatically calculating power curve limits in the method of automatically calculating power curve limits for power curve monitoring of a wind turbine according to the embodiment of the present invention.

FIGS. 16a to 16e are graphs showing examples according to the number of repetitions of an algorithm loop for automatically calculating power curve limits, which is applied to the input data shown in FIG. 15, in the method of automatically calculating power curve limits for power curve monitoring of a wind turbine according to the embodiment of the present invention.

BEST MODE

Hereinafter, embodiments of the present invention will be described in detail with reference to the accompanying drawings.

It should be noted that the drawings are not to precise scale and may be exaggerated in thickness of lines or size of components for descriptive convenience and clarity. In addition, terms used herein are defined by taking functions of the present invention into account and can be changed according to user or operator custom or intention. Therefore, definition of the terms should be made according to the overall disclosure set forth herein.

Figure 1A:
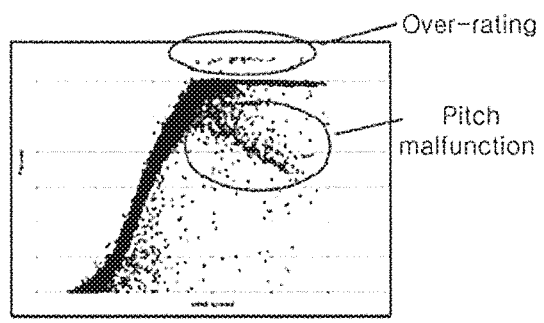
FIGS. 1A-1G show various power curves according to malfunction examples occurring in a typical wind turbine.
Figure 1B:
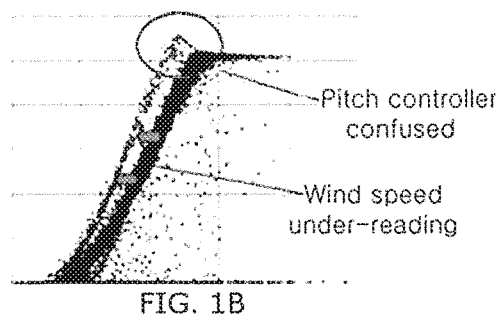
Figure 1C:
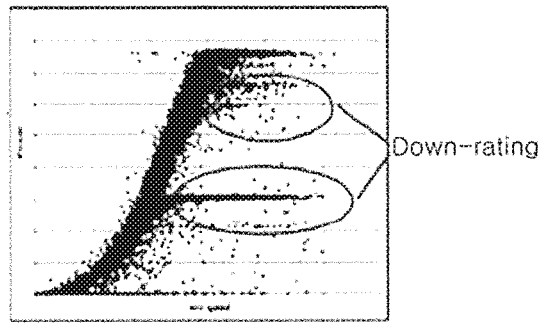
Figure 1D:
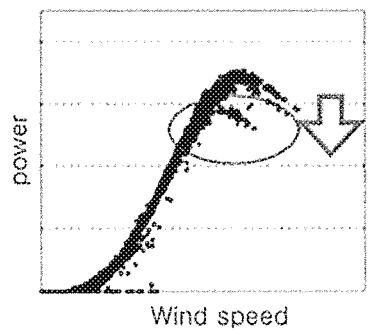
Figure 1E:
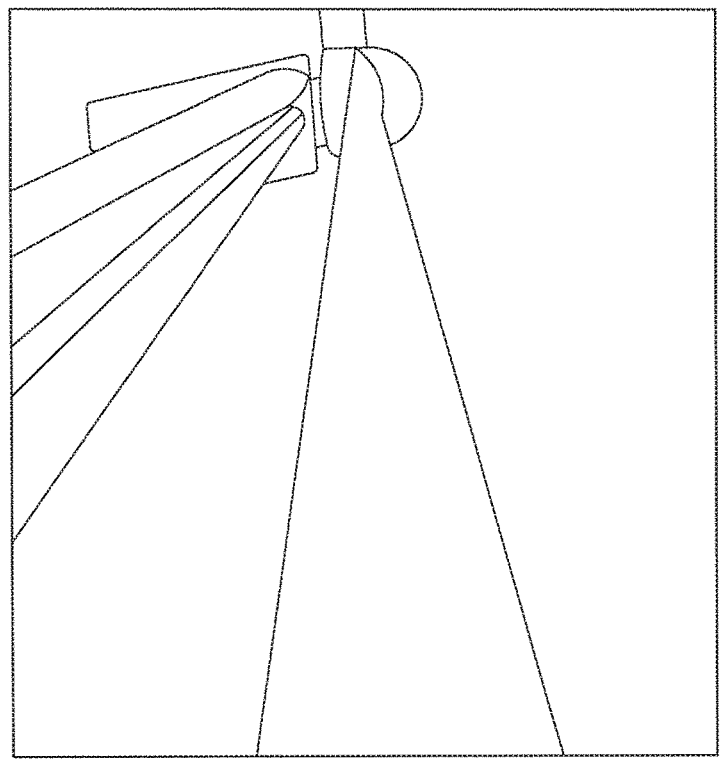
Figure 1F:
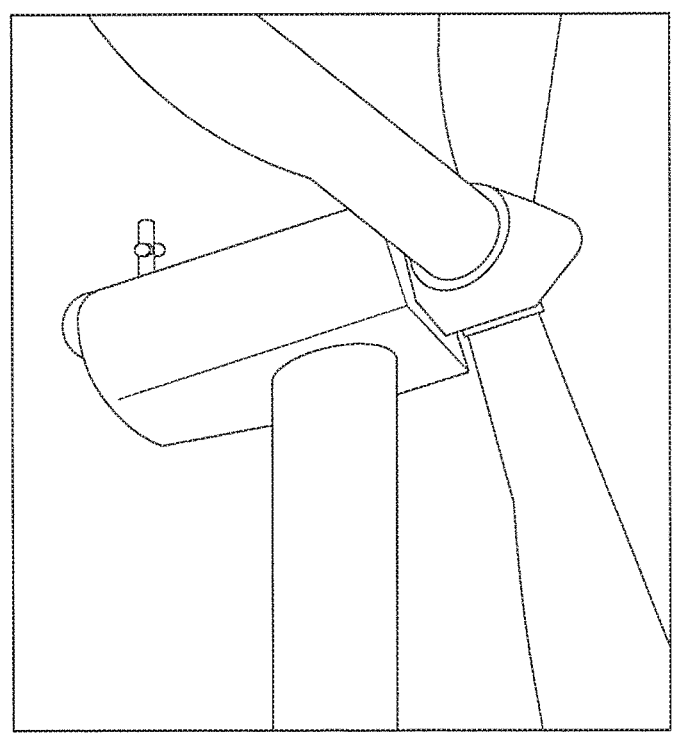
Figure 1G:
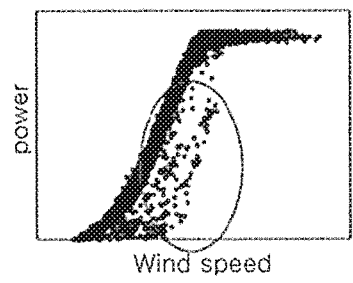
Figure 2:
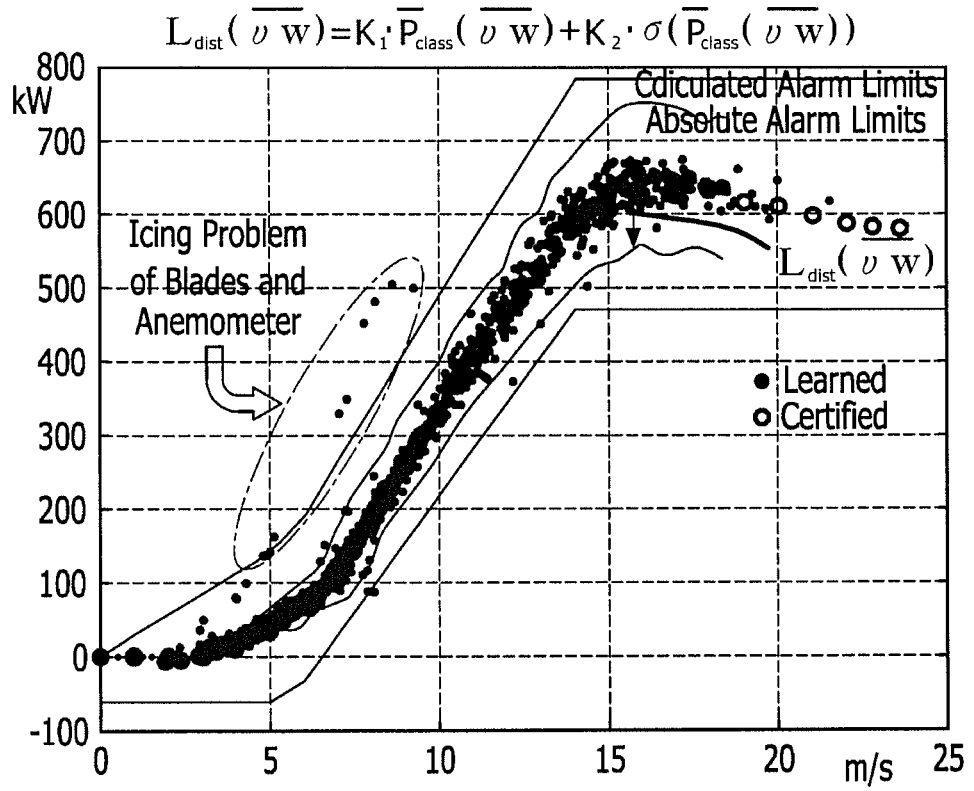
FIG. 2 is a graph showing an example of setting power curve limits measured in ISET according to a typical power curve monitoring technique.
Figure 3A:
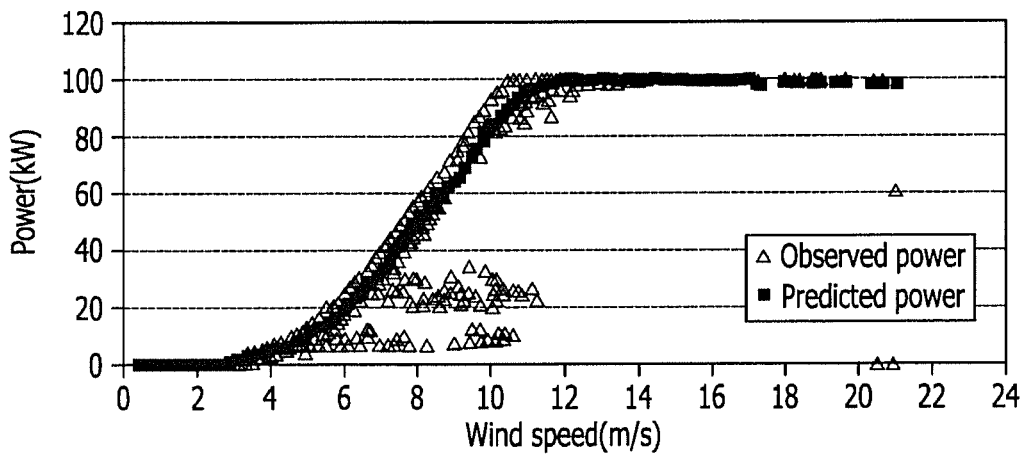
FIGS. 3a and 3b are graphs showing examples of setting power curve limits measured in the intelligent system laboratory according to a typical power curve monitoring technique.
Figure 3B:
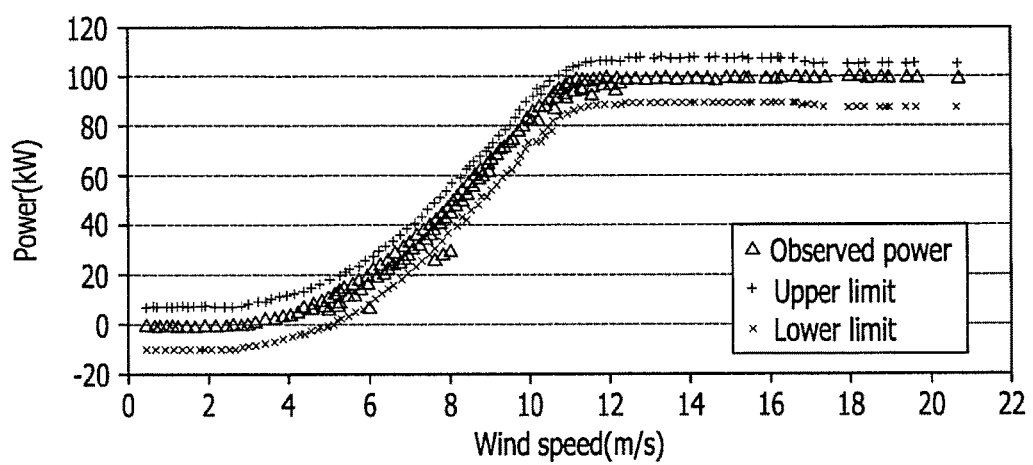
Figure 4:
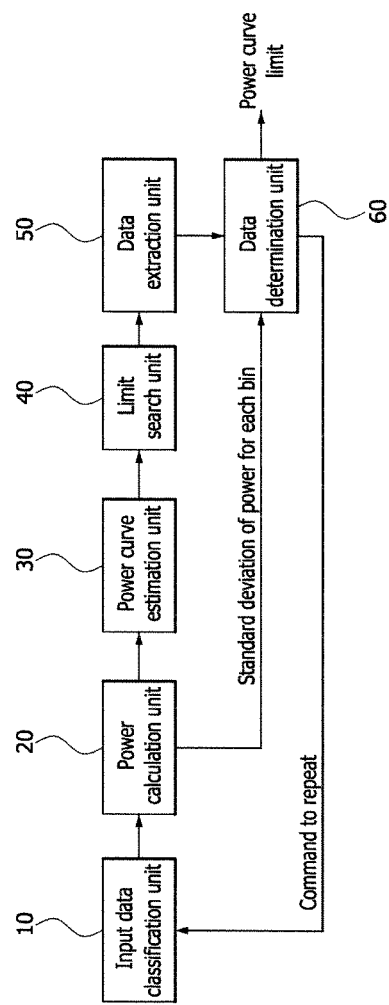
FIG. 4 is a block diagram of a device for implementing a method of automatically calculating power curve limits for power curve monitoring of a wind turbine according to one embodiment of the present invention.

FIG. 4 is a block diagram of a device for implementing a method of automatically calculating power curve limits for power curve monitoring of a wind turbine according to one embodiment of the present invention.

Referring to FIG. 4, the device for implementing a method of automatically calculating power curve limits for power curve monitoring of a wind turbine according to the embodiment of the present invention includes an input data classification unit 10, a power calculation unit 20, a power curve estimation unit 30, a limit search unit 40, a data extraction unit 50, and a data determination unit 60.

Mode For Invention

The input data classification unit 10 classifies input data entered during wind power generation, using variable speed bins. This is aimed at classifying wind speed-power data measured through specific measurement units to calculate a mean value and a standard deviation of power for each bin.

The power calculation unit 20 calculates a mean value and a standard deviation of the power input data for each bin classified through the input data classification unit 10. The mean value is used as an input value for estimating a power curve through interpolation, and the standard deviation is used to detei mine whether an entire algorithm loop is terminated.

The power curve estimation unit 30 receives the mean value of the input data for each bin calculated through the power calculation unit 20 and estimates a power curve using interpolation.

The limit search unit 40 excludes faulty data included in the input data while shifting the power curve, estimated through the power curve estimation unit 30, leftwards and rightwards or upwards and downwards.

The data extraction unit 50 extracts data, as new input data, between power curve limits obtained by excluding the faulty data while shifting the power curve leftwards and rightwards or upwards and downwards, by the limit search unit 40.

The data determination unit 60 calculates a mean value of the standard deviations of the power for the respective bins, calculated in the power calculation unit 20, by targeting the new input data extracted through the data extraction unit 50 and determines whether to terminate or repeat the entire algorithm loop by comparing the mean value with that of standard deviations calculated in the previous algorithm loop.

Next, a method of automatically calculating power curve limits for power curve monitoring of a wind turbine according to one embodiment of the invention will be described in detail with reference to a flowchart shown in FIG. 5 and FIGS. 6 to 16e.

Figure 5:
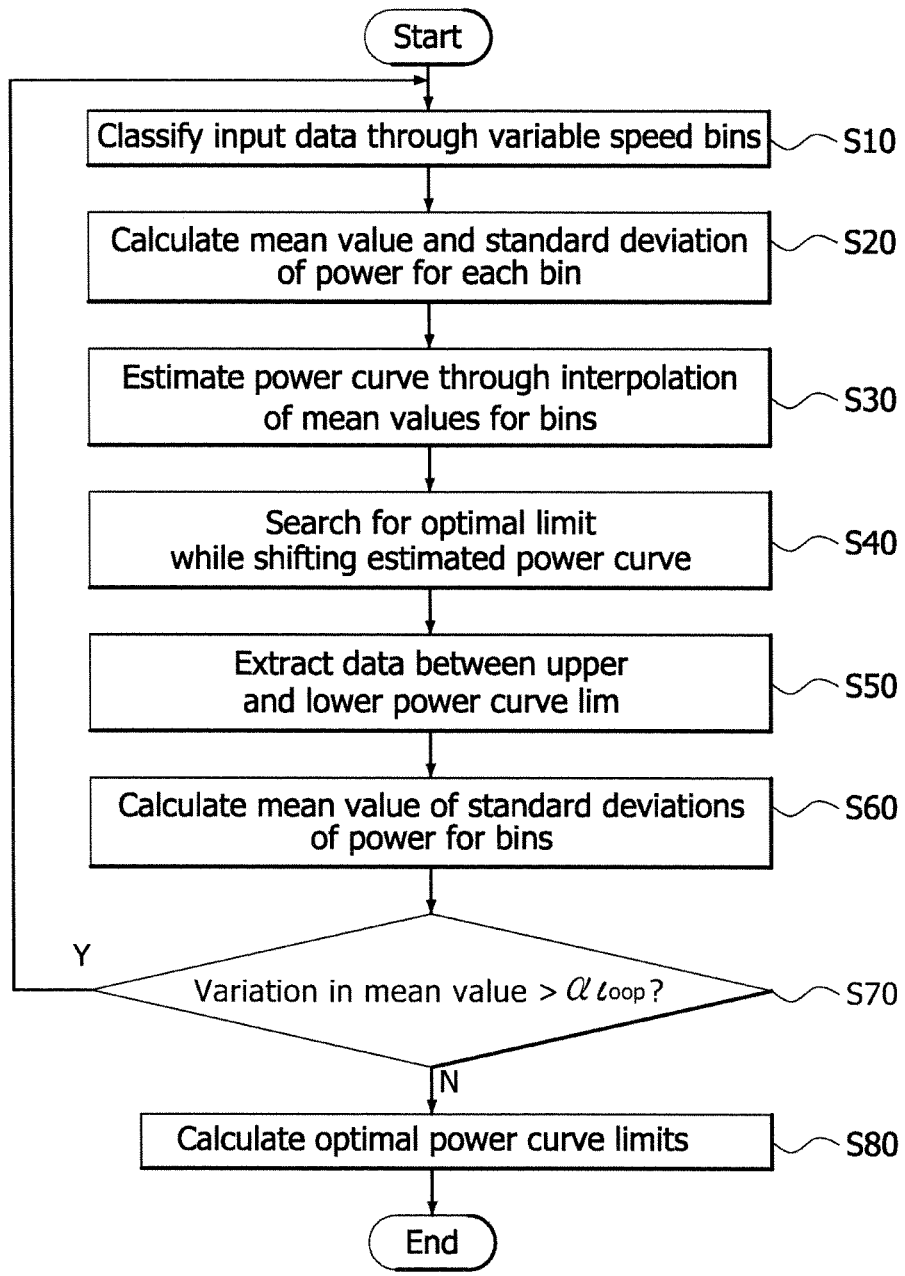
FIG. 5 is a flowchart showing a method of automatically calculating power curve limits for power curve monitoring of a wind turbine according to one embodiment of the present invention.

FIG. 5 is a flowchart showing a method of automatically calculating power curve limits for power curve monitoring of a wind turbine according to one embodiment of the present invention.#

In operation S10, an input data classification unit 10 classifies input data measured through specific measurement units during wind power generation, using variable speed bins.

Figure 6:
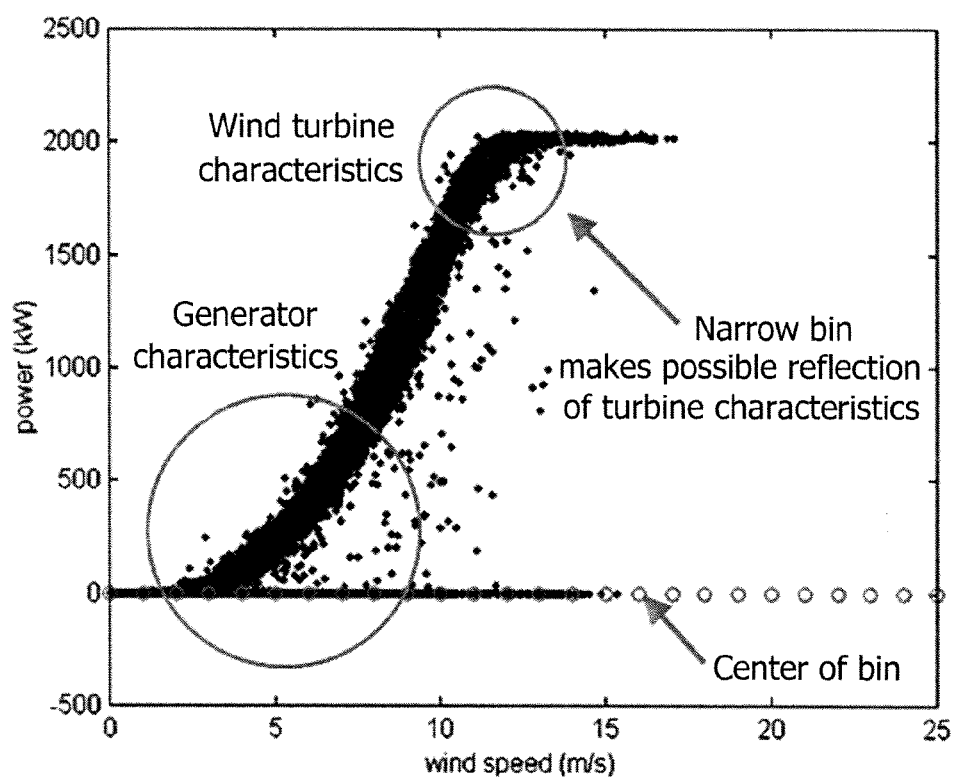
FIG. 6 is a graph showing power characteristics of a wind turbine according to wind speed, as input data of wind power generation, in the method of automatically calculating power curve limits for power curve monitoring of a wind turbine according to the embodiment of the present invention.

FIG. 6 is a graph showing power characteristics of a wind turbine according to wind speed, as input data of wind power generation, in the method of automatically calculating power curve limits for power curve monitoring of a wind turbine according to the embodiment of the present invention.

Referring to FIG. 6, the input data classification unit 10 classifies the measured wind speed-power data based on speed bins. The classification of the input data is aimed at making preparations for calculation of a mean value and a standard deviation for each bin. In the classification of the input data, a width of each bin is determined by Equation 1 below.

Bin Width=1/Number of repetition of entire algorithm loop (m/sec)     [Equation 1]

In determination of the bin width by Equation 1, the bin width has a value of 1 msec at first and a gradually decreasing value, such as ½ msec, ⅓ msec, and so on, as an entire algorithm loop is repeated.

The reasons for using the variable speed bins are as follows. First, much faulty data may be included in the initial input data and therefore, a wide bin is used to minimize an influence of the faulty data. Second, as shown in FIG. 6, characteristics of a generator dominate entire system characteristics at low wind speeds so that power smoothly increases, whereas characteristics of a wind turbine under pitch control dominate the entire system characteristics near the rated wind speed so that power is rapidly adjusted. Therefore, a narrower bin is to be used to reflect such control characteristics of the wind turbine.

In operation S20, a power calculation unit 20 calculates a mean value and a standard deviation of the classified power input data for each bin. This is for the purpose of using the mean value of power for each bin as an input value for estimating a power curve through interpolation by a power curve estimation unit 30 and to use the standard deviation of power for each bin in determining whether to terminate the entire algorithm loop by a data determination unit 60.

Figure 7:
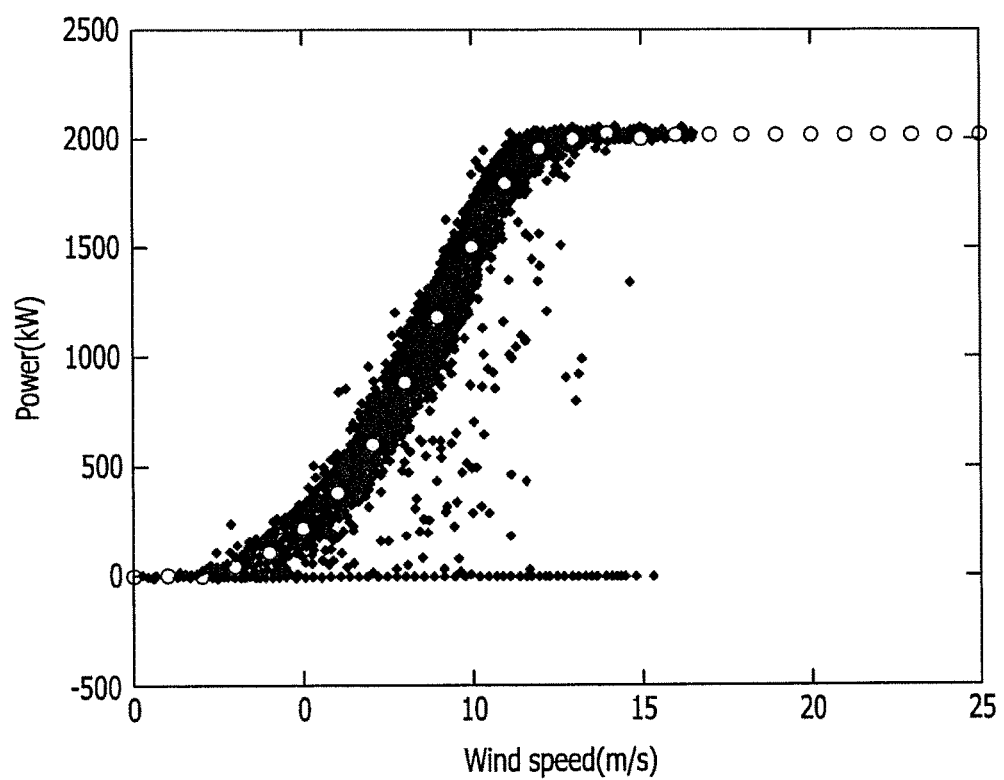
FIG. 7 is a graph showing the mean value of the classified power input data for each bin in the method of automatically calculating power curve limits for power curve monitoring of a wind turbine according to the embodiment of the present invention.

FIG. 7 is a graph showing the mean value of the classified power input data for each bin in the method of automatically calculating power curve limits for power curve monitoring of a wind turbine according to the embodiment of the present invention.

Referring to FIG. 7, the power calculation unit 20 calculates the mean value of the power input data for each bin which has been classified by the input data classification unit 10, and the mean value is displayed in the center of the bin.

In operation S30, the power curve estimation unit 30 inputs the mean value of power for each bin which has been calculated in the power calculation unit 20 and estimates a power curve using interpolation.

Figure 8:
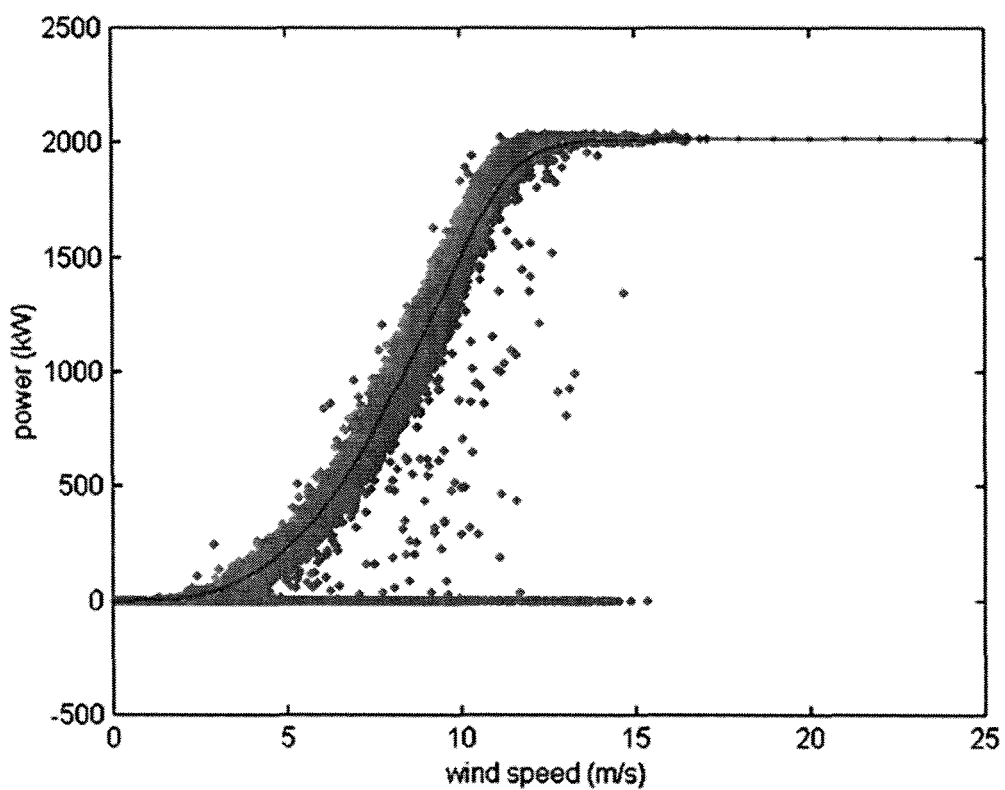
FIG. 8 is a graph showing a power curve estimated using interpolation in the method of automatically calculating power curve limits for power curve monitoring of a wind turbine according to the embodiment of the present invention.

FIG. 8 is a graph showing a power curve estimated using interpolation in the method of automatically calculating power curve limits for power curve monitoring of a wind turbine according to the embodiment of the present invention.

Referring to FIG. 8, the power curve estimation unit 30 estimates a power curve using cubic B-spline interpolation exhibiting excellent efficiency. Although the cubic B-spline interpolation is used as an interpolation method for estimating a power curve in the embodiment of the invention, the present invention is not limited thereto, and a variety of interpolation methods known in the art may be used.

After estimation of the power curve, in operation S40, a limit search unit 40 excludes as much faulty data as possible while shifting the estimated power curve leftwards and rightwards or upwards and downwards, thereby searching for optimal power curve limits including only normal data if possible. That is, the limit search unit 40 excludes as much faulty data as possible from the existing input data to select only normal data as new input data for a next algorithm loop.

Figure 9A:
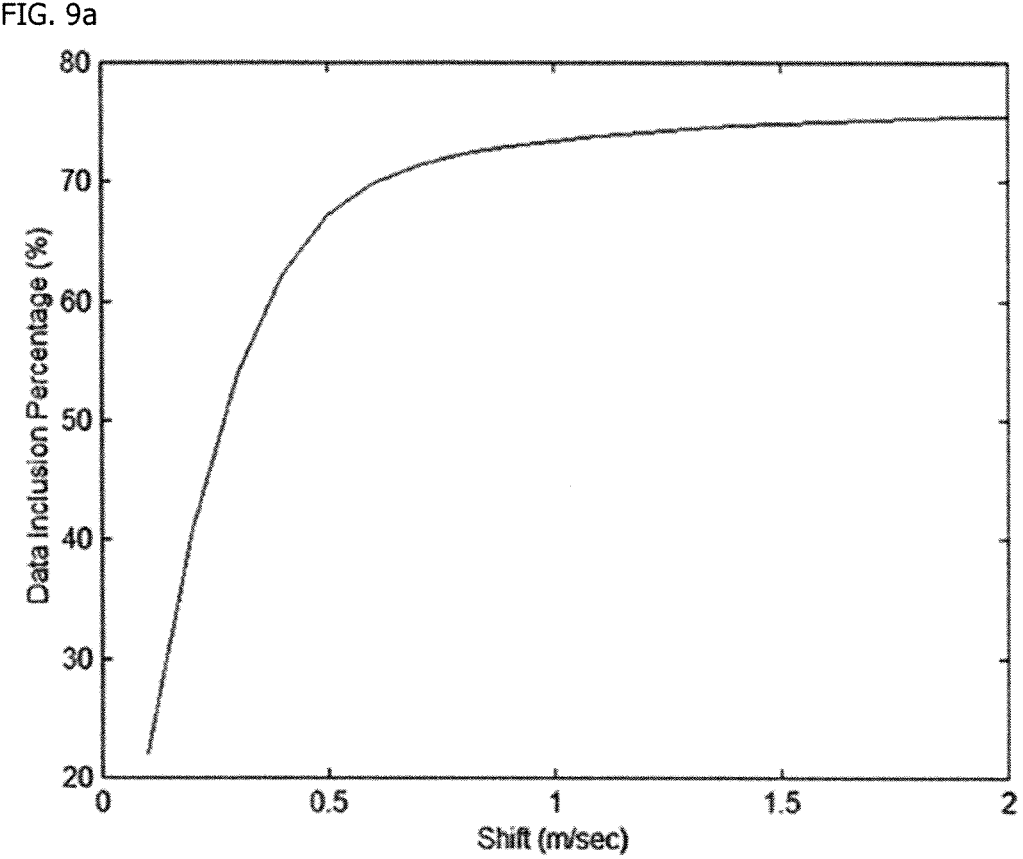
FIGS. 9a and 9b are graphs showing percentages and variations of data present between upper and lower power curve limits according to horizontal moving distances, respectively, in the method of automatically calculating power curve limits for power curve monitoring of a wind turbine according to the embodiment of the present invention.
Figure 9B:
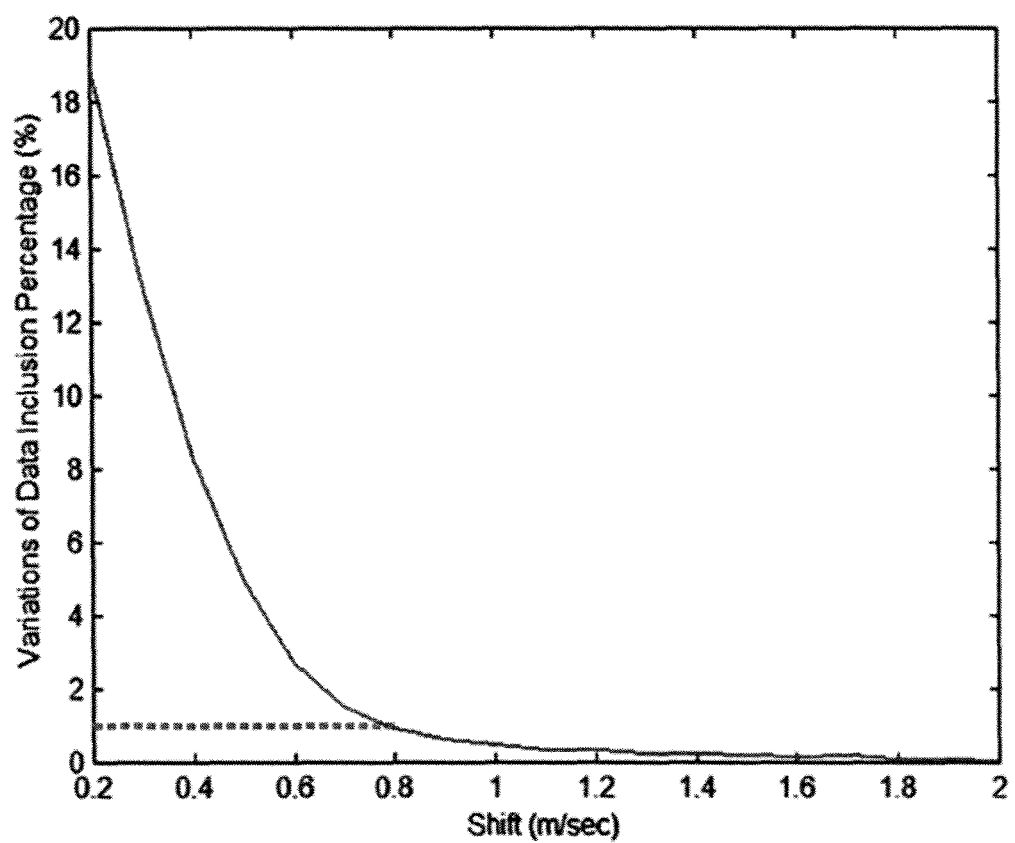
Figure 10:
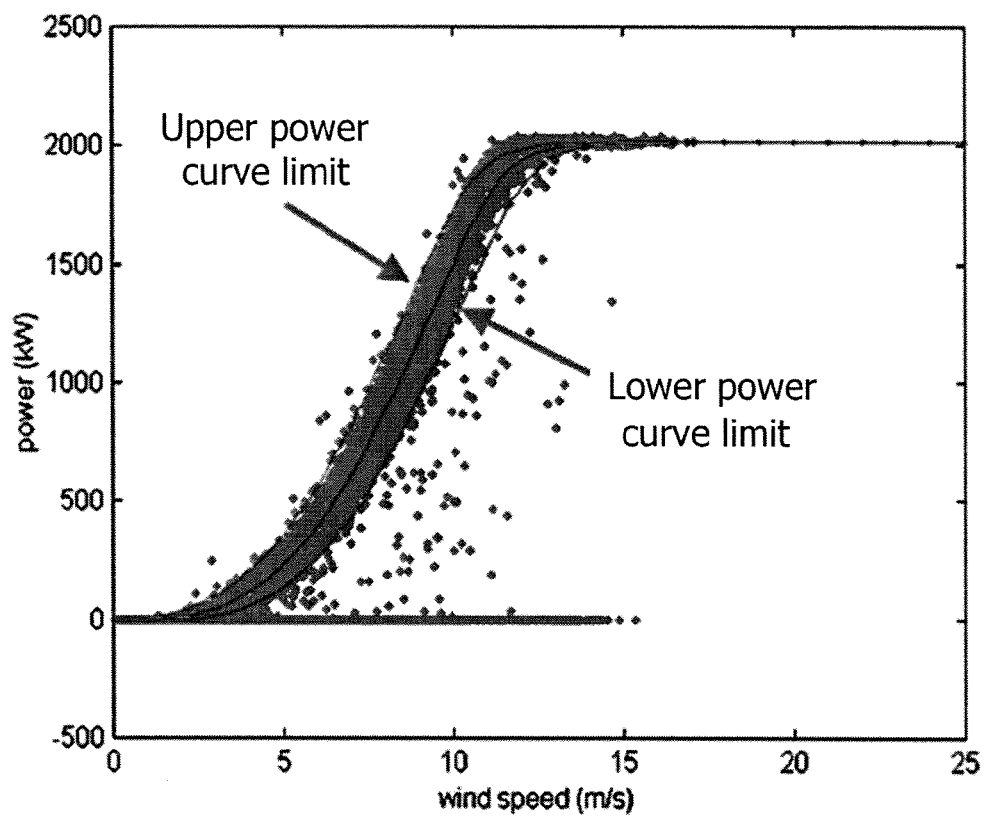
FIG. 10 is a graph showing optimal upper and lower power curve limits obtained through horizontal movement of the power curve in the method of automatically calculating power curve limits for power curve monitoring of a wind turbine according to the embodiment of the present invention.

FIGS. 9a and 9b are graphs showing percentages and variations of data present between upper and lower power curve limits according to horizontal moving distances, respectively, in the method of automatically calculating power curve limits for power curve monitoring of a wind turbine according to the embodiment of the present invention, and FIG. 10 is a graph showing optimal upper and lower power curve limits obtained through horizontal movement of the power curve in the method of automatically calculating power curve limits for power curve monitoring of a wind turbine according to the embodiment of the present invention.

As shown in FIG. 10, the limit search unit 40 searches for optimal upper and lower power curve limits including only normal data therebetween if possible, while shifting the power curve, obtained by the estimation, leftwards and rightwards. The upper and lower power curve limits indicate power curve limits which are to be placed above and below the estimated power curve.

The limit search unit 40 determines whether optical upper and lower power curve limits have been obtained, based on an inequality such as Equation 2 below. In this case, the limit search unit 40 repeatedly shifts the power curve leftwards and rightwards by a distance of ΔV until the inequality of Equation 2 is satisfied. In FIG. 10, ΔV is 0.1 msec.

$$PDL_i - PDL_{i-1} \leq \beta_{shift} (i>1) \quad \text{[Equation 2]}$$

where i denotes the number of repetitions of a limit search algorithm, and $\beta_{shift}$ is a constant for determining whether optimal upper and lower power curve limits have been determined at the present stage. In FIGS. 9a, 9b, and 10, βshift is 1%. PDL having units of % is defined by Equation 3 below.

$$PDL_i = \left[ \frac{\text{Number of data present between upper and lower power curve limits}}{\text{Total number of input data}} \times 100 \right]_i \quad \text{[Equation 3]}$$

Figure 11A:
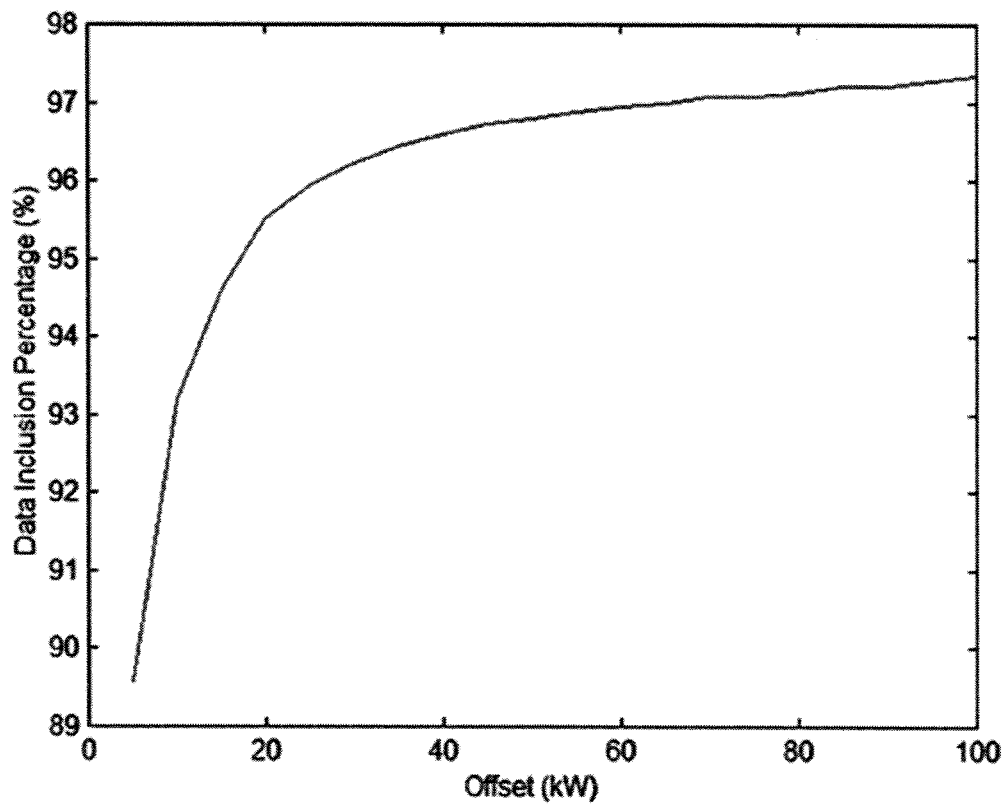
FIGS. 11a and 11b are graphs showing percentages and variations of data present between upper and lower power curve limits according to vertical moving distances, respectively, in the method of automatically calculating power curve limits for power curve monitoring of a wind turbine according to the embodiment of the present invention.
Figure 11B:
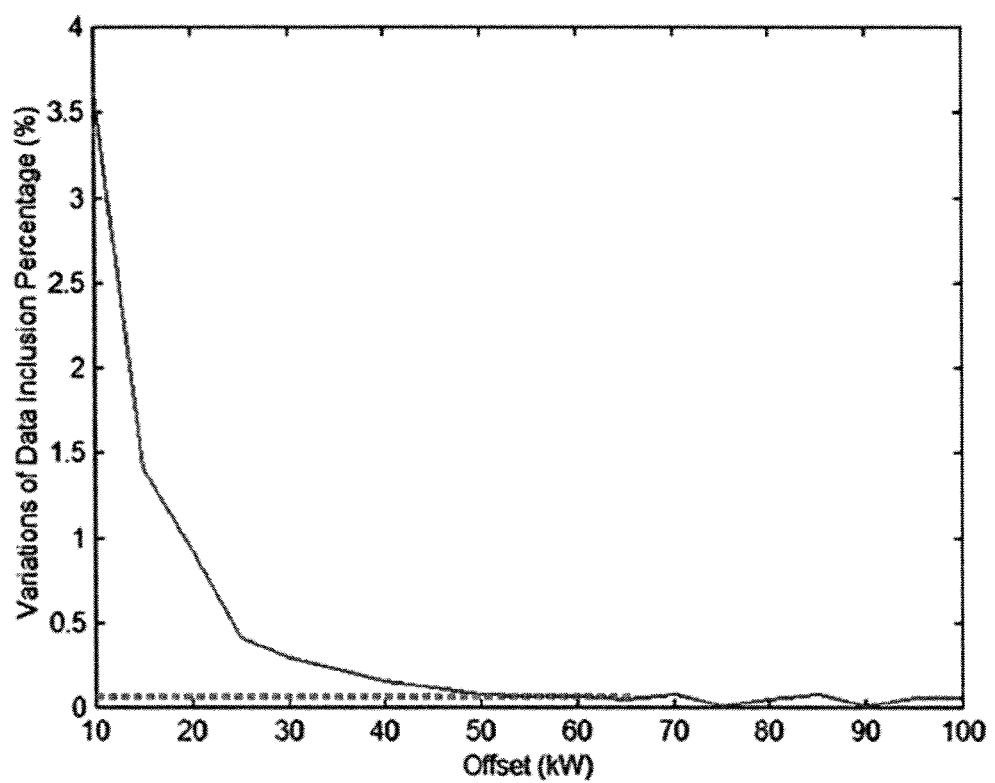
Figure 12:
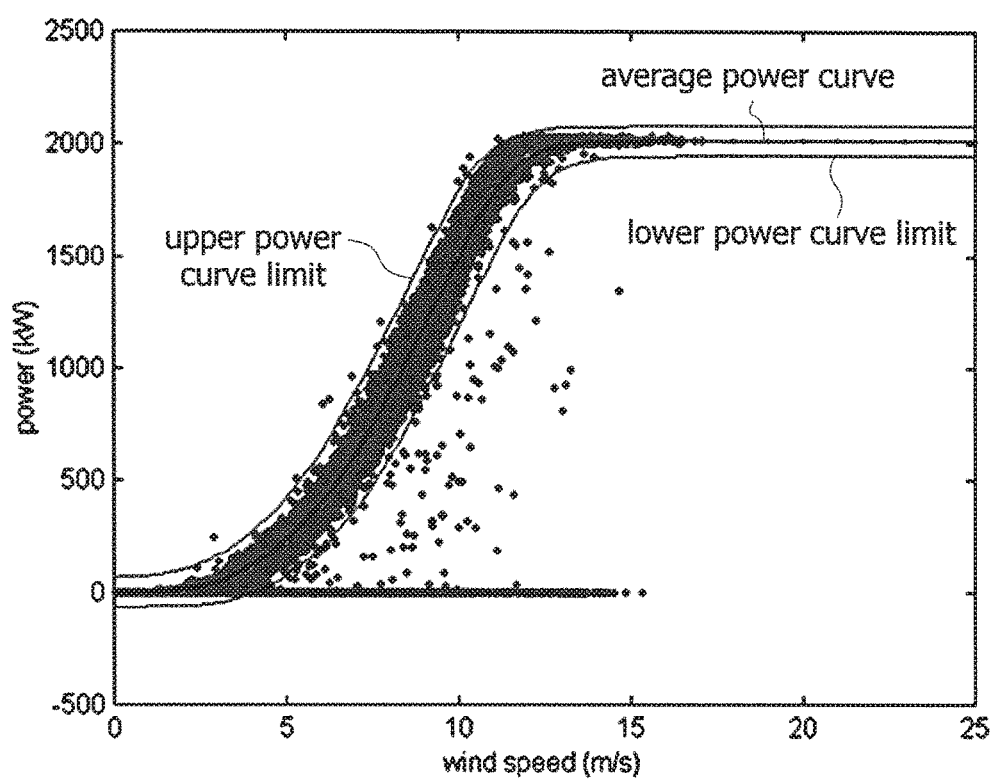
FIG. 12 is a graph showing optimal upper and lower power curve limits obtained through vertical movement of the power curve in the method of automatically calculating power curve limits for power curve monitoring of a wind turbine according to the embodiment of the present invention.

FIGS. 11a and 11b are graphs showing percentages and variations of data present between upper and lower power curve limits according to vertical moving distances, respectively, in the method of automatically calculating power curve limits for power curve monitoring of a wind turbine according to the embodiment of the present invention, and FIG. 12 is a graph showing optimal upper and lower power curve limits obtained through vertical movement of the power curve in the method of automatically calculating power curve limits for power curve monitoring of a wind turbine according to the embodiment of the present invention.

As shown in FIG. 12, the limit search unit 40 searches for optimal upper and lower power curve limits including only normal data if possible, while shifting the upper and lower power curve limits, shown in FIG. 10, upwards and downwards.

In the same way, the limit search unit 40 determines whether the optical upper and lower power curve limits have been obtained at the present stage, based on an inequality such as Equation 4 below. In this case, the limit search unit 40 repeatedly shifts the power curve upwards and downwards by a distance of ΔP until the inequality of Equation 4 is satisfied. In FIG. 12, ΔP is 5 kW.

$$PDL_i - PDL_{i-1} < \gamma_{offset} (i>1) \quad \text{[Equation 4]}$$

where i denotes the number of repetitions of a limit search algorithm, PDL is defined by Equation 3, and γoffset is a constant for determining whether optimal upper and lower power curve limits have been determined at the present stage. In FIGS. 11a, 11b, and 12, $\gamma_{offset}$ is 0.05%.

In the limit search function, the optimal upper and lower power curve limits have been obtained through the leftward and rightward movement of the power curve limits and then through the upward and downward movement thereof. However, the order is not limited thereto, and the optimal upper and lower power curve limits may also be obtained in reverse order.

In operation S50, a data extraction unit 50 extracts only data present between the upper and lower power curve limits as new input data, by targeting the upper and lower power curve limits set to exclude faulty data from the input data.

Figure 13:
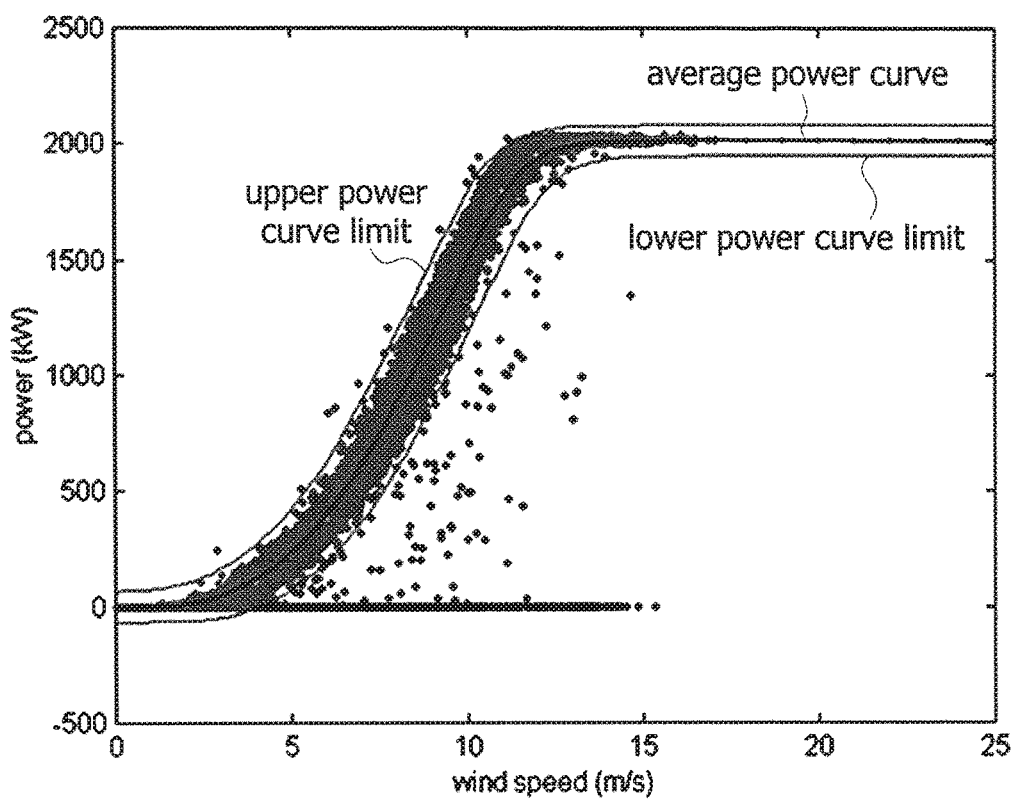
FIG. 13 is a graph showing input data newly selected according to an automatic calculation algorithm for power curve limits in the method of automatically calculating power curve limits for power curve monitoring of a wind turbine according to the embodiment of the present invention.
Figure 14B:
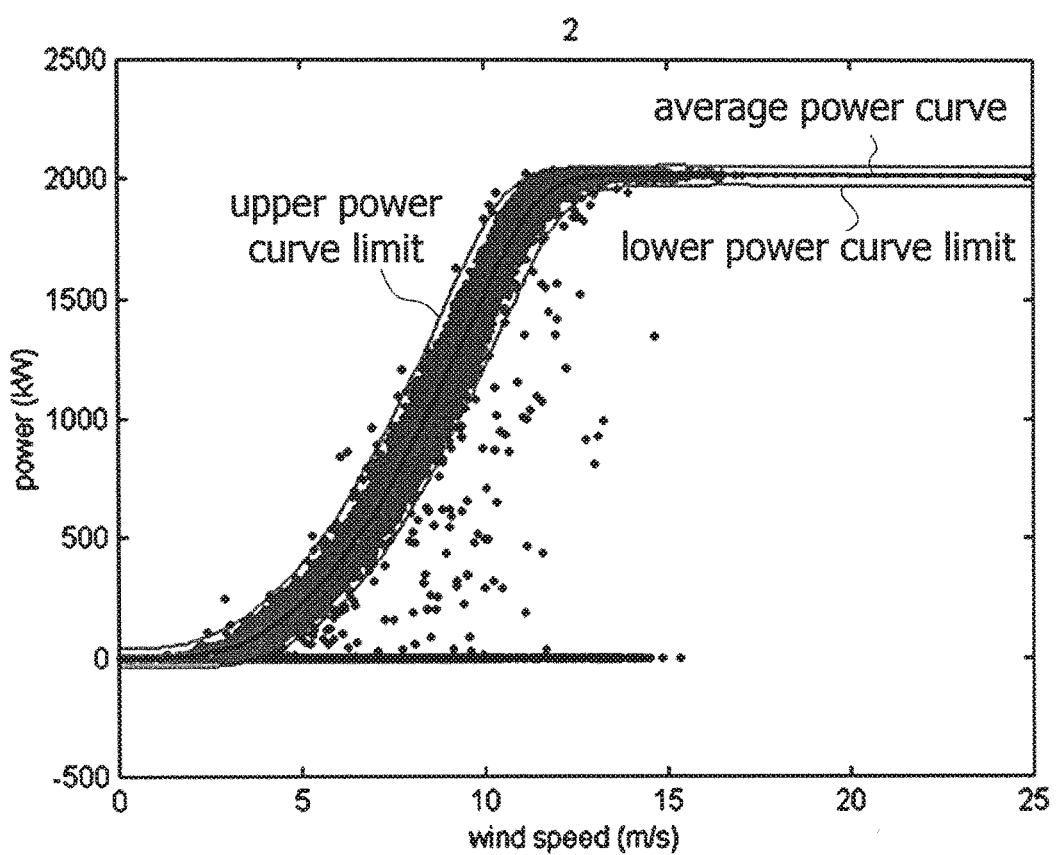

FIG. 13 is a graph showing input data newly selected according to an automatic calculation algorithm for power curve limits in the method of automatically calculating power curve limits for power curve monitoring of a wind turbine according to the embodiment of the present invention.

As shown in FIG. 13, the data extraction unit extracts only data present between the upper and lower power curve limits, obtained for the existing input data, as newly selected input data.

In operation S60, the data determination unit 60 receives the standard deviations of power for the bins which have been calculated in the power calculation unit 20 and calculates a mean value of the standard deviations in order to determine whether to terminate the entire algorithm loop, by targeting the input data newly extracted by the data extraction unit 50.

After calculating the mean value of the standard deviations, in operation S80, the data determination unit 60 compares the currently calculated mean value of the standard deviations with the previous mean value of standard deviations calculated in the previous algorithm loop and determines whether a variation in mean value is greater than $a_{loop}$ which is a constant for determining the termination of the power curve calculation algorithm.

The determination as to whether the variation in mean value is greater than $a_{loop}$ is based upon the inequality of Equation 5 below.

$$\text{(Mean value of standard deviations of power for bins)}_k - \text{(Mean value of standard deviations of power for bins)}_{k-1} < a_{loop} \quad \text{[Equation 5]}$$

where k (k>1) denotes the number of repetitions of the entire algorithm loop, and $a_{loop}$ is a constant for determining whether to terminate the entire algorithm loop for automatic calculation of power curve limits. In FIG. 13, $a_{loop}$ is 1.

When it is determined that the variation in mean value of standard deviations is less than the constant $a_{loop}$ as expressed by the inequality of Equation 5, in operation S80, the data determination unit 60 yields the upper and lower power curve limits, obtained by the limit search unit 40, as optimal (i.e., accurate) power curve limits and terminates the entire algorithm loop. In contrast, when it is determined that the inequality of Equation 5 has not been satisfied, the operation flow returns to operation S10 to perform the entire algorithm loop again. In this case, the process of classifying input data through variable speed bins is restarted using the new input data extracted by the data extraction unit 50, in operation S10.

FIGS. 14a to 14d are graphs showing examples according to the number of repetitions of an algorithm loop for automatically calculating power curve limits in the method of automatically calculating power curve limits for power curve monitoring of a wind turbine according to the embodiment of the present invention.

FIGS. 14a to 14d show results according to the number of repetitions of the entire algorithm loop when the algorithm for automatically calculating power curve limits according to the embodiment of the invention is applied. The results show that the entire algorithm loop is terminated after being repeated four times and power curve limits are successfully calculated therethrough.

Figure 15:
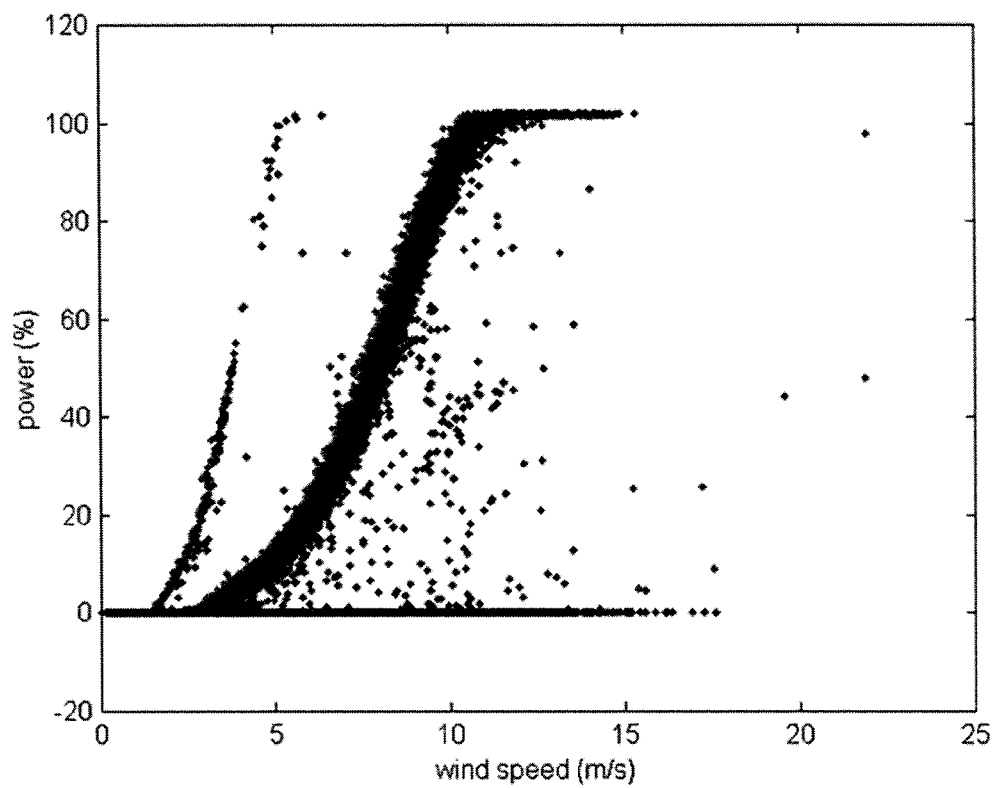
FIG. 15 is a graph showing input data including much faulty data in the method of automatically calculating power curve limits for power curve monitoring of a wind turbine according to the embodiment of the present invention.
Figure 16B:
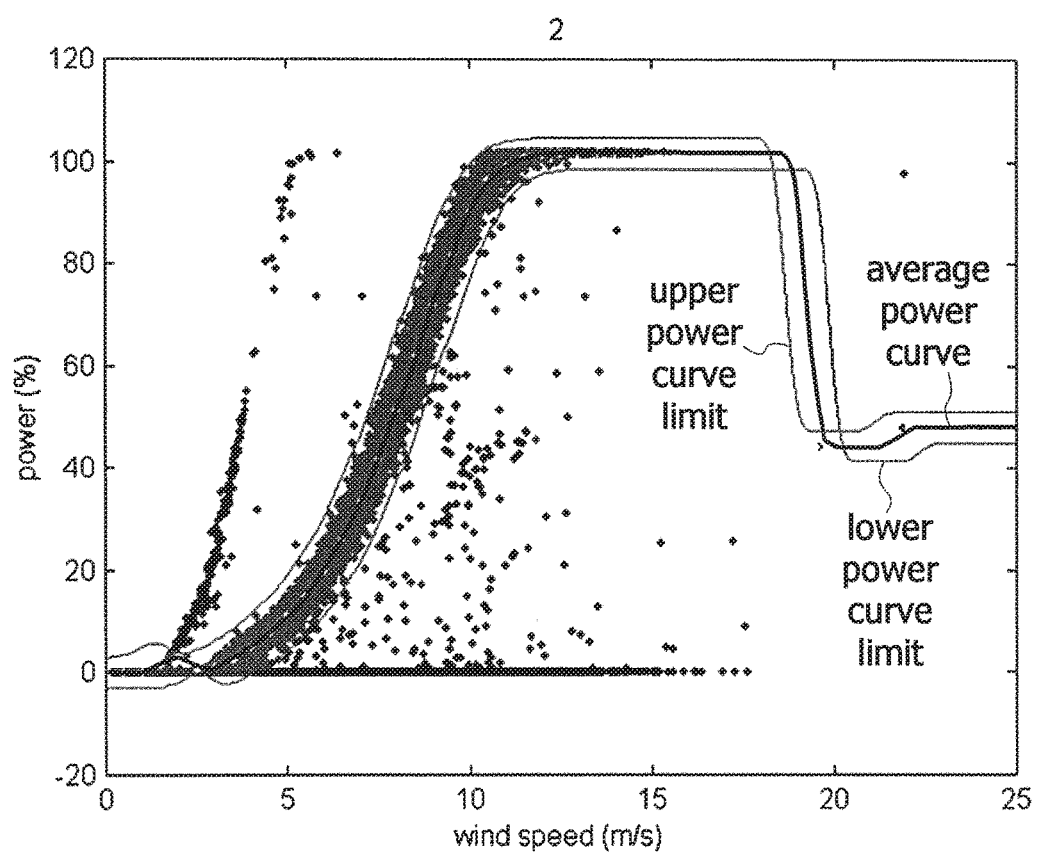
Figure 16E:
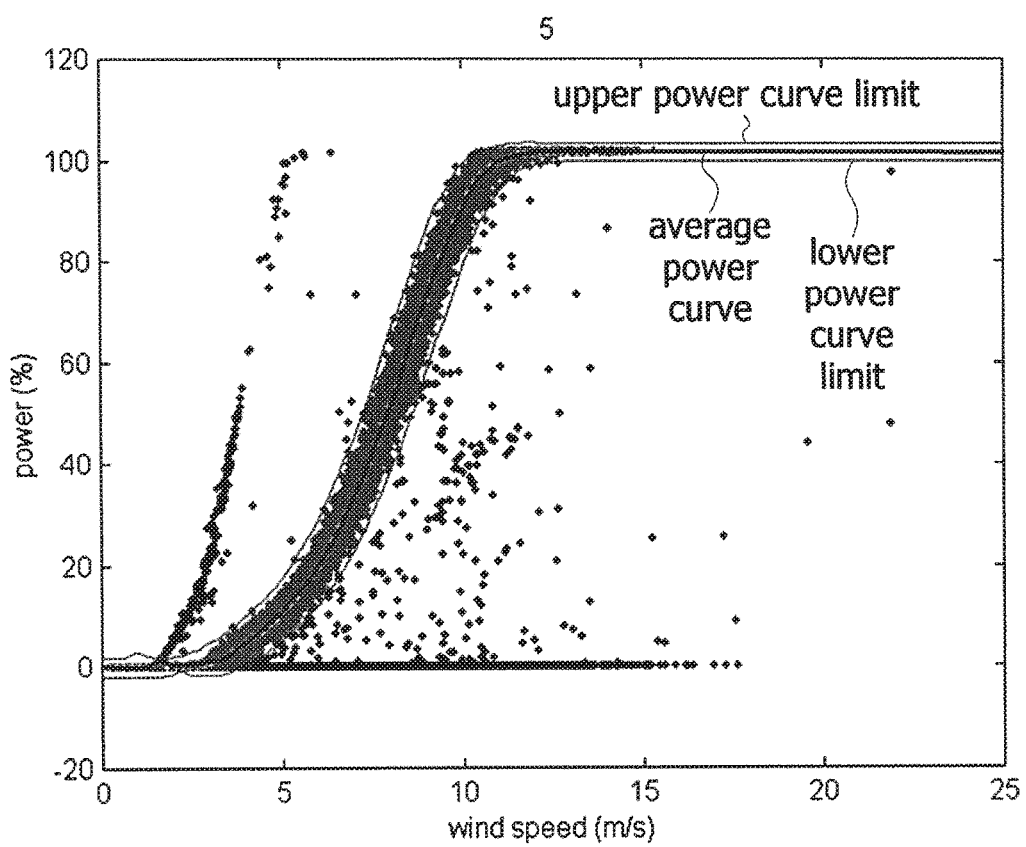

FIG. 15 is a graph showing input data including much faulty data in the method of automatically calculating power curve limits for power curve monitoring of a wind turbine according to the embodiment of the present invention, and FIGS. 16a to 16e are graphs showing examples according to the number of repetitions of an algorithm loop for automatically calculating power curve limits, which is applied to the input data shown in FIG. 15, in the method of automatically calculating power curve limits for power curve monitoring of a wind turbine according to the embodiment of the present invention.

FIG. 15 shows other input data of an MW wind turbine. It can be observed that the input data shown in FIG. 15 includes more faulty data than the input data shown in FIG. 6.

Referring to FIGS. 16a to 16e, it can be identified that, when the algorithm according to the embodiment of the invention is applied to the input data shown in FIG. 15, the entire algorithm loop is terminated after being repeated five times, and power curve limits are successfully calculated in spite of much faulty data.

Although some embodiments have been described above with reference to the accompanying drawings, it should be understood that these embodiments are given by way of illustration only, and that various modifications, variations, and alterations can be made without departing from the spirit and scope of the present invention. Therefore, the scope of the present invention should be limited only by the accompanying claims and equivalents thereof.

The invention claimed is:

1. A method of automatically calculating power curve limits for power curve monitoring of a wind turbine, comprising:
    a first operation of classifying input data of wind power generation through variable speed bins by an input data classification unit;
    a second operation of calculating a first mean value and a standard deviation of power for each bin for the classified input data by a power calculation unit;
    a third operation of estimating a power curve for the first mean value of power for each bin by a power curve estimation unit;
    a fourth operation of searching for accurate power curve limits while shifting the estimated power curve by a limit search unit; and a fifth operation of setting the input data between the accurate power curve limits as new input data by a data extraction unit.

2. The method according to claim 1, wherein the input data classification unit determines wind speed-power data of the input data based on the variable speed bins according to a bin width given by equation below:

Bin Width=1/Number of repetition of entire algorithm loop (m/sec), wherein the entire algorithm loop includes the first to fifth operations.

3. The method according to claim 1, wherein the power curve estimation unit estimates the power curve using interpolation, based on the first mean value of power for each bin as an input for the interpolation.

4. The method according to claim 3, wherein the interpolation is cubic B-spline interpolation.

5. The method according to claim 1, wherein the limit search unit searches for the accurate power curve limits while shifting the power curve leftwards and rightwards or upwards and downwards.

6. The method according to claim 5, wherein the limit search unit repeatedly shifts the power curve leftwards and rightwards by a distance of a preset velocity until the following inequality is satisfied:

$$PDL_i - PDL_{i-1} < \beta_{shift}(i>1),$$

wherein i is the number of repetitions of a limit search algorithm, βshift is a constant for determining whether optimal upper and lower power curve limits are determined at a present stage, and PDL has units of %, and wherein PDL is defined by equation below:

$$PDL_i = \left[ \frac{\text{Number of data present between upper and lower power curve limits}}{\text{Total number of input data}} \times 100 \right]_i.$$

7. The method according to claim 5, wherein the limit search unit repeatedly shifts the power curve upwards and downwards by a distance of preset power until the following inequality is satisfied:

$$PDL_i - PDL_{i-1} < \gamma_{offset}(i>1)$$

where i is the number of repetitions of a limit search algorithm, PDL has units of %, and $\gamma_{shift}$ is a constant for determining whether accurate upper and lower power curve limits are determined, and wherein PDL is defined by equation below:

$$PDL_i = \left[ \frac{\text{Number of data present between upper and lower power curve limits}}{\text{Total number of input data}} \times 100 \right]_i.$$

8. The method according to claim 1, further comprising:
after setting the input data, receiving the calculated standard deviation of power for each bin from the power calculation unit and calculating a second mean value thereof by a data determination unit;
comparing, by the data determination unit, the second mean value with the first mean value and determining whether a variation in the first and second mean values is less than a constant for determining whether to terminate an entire algorithm loop including the first to fifth operations; and
determining that the accurate power curve limits have been calculated and terminating execution of the algorithm loop when the variation in the first and second mean values is less than the constant, and repeating the algorithm loop using the new input data when the variation in the first and second mean values is greater than the constant.

* * * * *